3,348,683
METHOD OF SEPARATING PARTICLES IN LIQUID SUSPENSION IN A HYDROCYCLONE FOR SEPARATING ARTICLES IN LIQUID SUSPENSION
Nils Anders Lennart Wikdahl, 16 Burevagen, Djursholm, Sweden
Filed Sept. 8, 1961, Ser. No. 136,833
Claims priority, application Sweden, Sept. 13, 1960, 8,723/60
3 Claims. (Cl. 210—84)

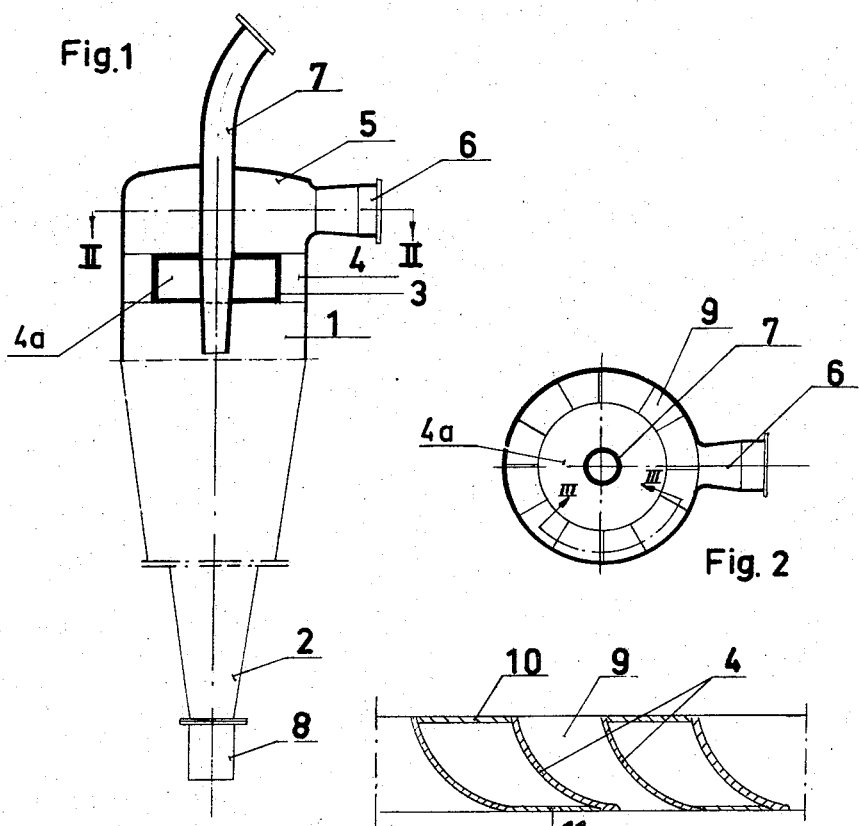
Fig. 1
Fig. 2
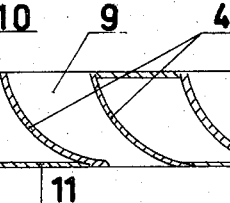
Fig. 3
INVENTOR
NILS ANDERS LENNART WIKDAHL
ATTORNEYS Уnited States Patent Office 3,348,683
Patented Oct. 24, 1967

The present invention relates to cyclones for separating material such as discrete particles suspended in a fluid flow.

In cyclones of this kind, the suspension is generally fed through a tangential inlet into a separation chamber of the cyclone and the collected material and the fluid liberated from the material are discharged through separate, usually axially disposed, outlets. Due to the tangential feed of the suspension a vortex is formed in the separation chamber and such vortex is maintained by supplying the fluid under pressure which is more or less completely transformed into kinetic energy in the inlet zone of the cyclone. When the fluid flow containing the particles or other material is in gaseous form, the specific gravity of the fluid is generally low and its volume is high. Then it does not present particular difficulties to maintain the required flow velocity in the inlet or the cyclone and it is also readily possible to provide several tangential inlets without being compelled to dimension such inlets unduly small to attain the required high flow velocity in the inlets. The provision of several, usually symmetrically disposed inlets is desirable as it results in advantageous flow conditions in the separation chamber of the cyclone. However, when the fluid flow is a liquid flow, the specific gravity is fairly high while the volume is small and the viscosity of the liquid is often low. Then the provision of several inlets necessitates very small dimensions for such inlets, as otherwise the required high velocity of flow cannot be obtained at the inlets. Furthermore, a high inlet pressure and a correspondingly heavy power supply are needed to produce the required high flow velocity and the high flow velocity results in a marked wear and tear at the inlets. Accordingly, it has been thought heretofore that multiple inlets would not be practical with cyclones for separating liquid suspensions.

It is a broad object of the present invention to provide a novel and improved method of operating a cyclone for separating liquid suspensions in a manner such that several inlets may be used without entailing the aforementioned disadvantages.

It is also a broad object of the invention to provide a novel and improved cyclone for separating liquid suspensions which affords the advantage of improved flow conditions within the separation chamber and of low power demands due to the use of several preferably symmetrically disposed inlets without entailing the disadvantage of multiple channels heretofore connected with multiple inlets.

According to the invention a liquid suspension is fed into the cyclone through several symmetrically disposed, circumferentially spaced tangential inlets at a pressure of the liquid between 0.5 to 2.5 atmospheres, preferably 1.0 to 2.0 atmospheres, and the liquid flow is so conducted that the entry speed of the flow into the separation chamber of the cyclone is 1 to 8 meters/sec., preferably 2 to 6 meters/sec. As is evident, the entry speed of the tangentially directed flow is comparatively low and the increase of the flow velocity to the required rate occurs in the separation chamber proper. Tests have shown that the maximum end velocity is about equal to that in conventional cyclones for liquid suspensions having a single tangential inlet, and that the maximum speed is reached in a zone closer to the center axis of the separation chamber than the zone of maximum speed in conventional cyclones. Since the centrifugal force in a cyclone is inversely proportional to the third power of the radius, such more central location of the zone of maximum velocity results inherently in a substantially improved separation action and such improved separation action is attained with less power.

It has been proposed to maintain the pressure at the inlet of a hydro-cyclone for separating pulp suspensions below 2.5 atmospheres, for instance 1.4 to 2.1 kgs./cm.$^2$. However, the use of such low pressure has not been coupled with the use of several inlets. In other words, in hydrocyclones as just referred to, a low pressure at the inlet and a low velocity at the inlet are not simultaneously employed in the manner of the invention, but the energy of pressure is transformed into energy of speed substantially completely in the inlet. In an arrangement of this kind the power consumption is bound to be high, partly due to shock losses at the entry of the suspension into the separation chamber and partly due to vibration losses in the separation chamber caused by an asymmetric feed of the suspension. As pointed out before, the method and the apparatus according to the invention avoid appreciable losses of this kind and result in an improved separation action.

Other and further objects, features and advantages of the invention will be pointed out hereinafter and set forth in the appended claims constituting part of the application.

In the accompanying drawing a preferred embodiment of the invention is shown by way of illustration. In the drawing:

FIG. 1 is an elevational view, partly in section, of a hydrocyclone according to the invention.

FIG. 2 is a section taken on line II—II of FIG. 1.

FIG. 3 is a fragmentary view of the feed ducts of the cyclone according to FIG. 2, line III—III.

Referring now to the figures in detail, the hydrocyclone as exemplified, comprises a separation chamber 1 continued by a set-off generally conical portion 2, which in turn terminates in an outlet or nozzle 8 for discharging material liberated from the suspension. The upper part of the cyclone is closed to define a feed chamber 5 into which issues a radially directed duct 6 for supplying a liquid containing the material to be separated to the feed chamber. Feed chamber 5 is separated from separation chamber 1 by a flow control member 3. Control member 3 comprises a plurality of curved blades 4 disposed about a hub portion 4a. As is shown in FIG. 1, the hub portion is closed except for a centrally and axially disposed pipe 7, which protrudes through the feed chamber and the hub into the separation chamber and serves to discharge liquid liberated from the material. Accordingly, the only connection between feed chamber 5 and separation chamber 1 is through ducts 9 defined by blades 4. As can be best seen in FIG. 2, the blade ring defines a plurality of ducts 9 circumferentially and preferably uniformly spaced about the central hub portion 4a. Ducts 9 are oriented substantially parallel to the axis of the cyclone at the side facing the feed chamber. The curvature of the ducts is such that the discharge end thereof defines an angle with the longitudinal axis of the cyclone thus imparting to the streams of liquid flowing through the ducts a substantially tangential direction.

As is shown in FIG. 3, alternate ducts defined by blades 4 are closed up by cover plates 10 and 11. By varying the number and location of the ducts closed up by the cover plates the flow of liquid from the feed chamber into the separation chamber can be readily controlled in accordance with the specific requirements of an operation. For instance, it may be advisable to close up only every third or fourth duct rather than every second duct as shown.

The hydrocyclone, as hereinbefore described, operates as follows:

A liquid suspension is fed into the feed chamber 5 through duct 6 at a pressure between 0.5 to 2.5 atmospheres, preferably between 1.0 and 2.0 atmospheres. The liquid then flows into the separation chamber 1 through the open ducts 9 and issues into the separation chamber with a tangentially directed speed component. Due to the configuration of the ducts, only a small portion, for instance less than 20% and preferably less than 10%, of the pressure energy which the suspension possesses before it enters the ducts is transformed into kinetic energy while the suspension flows through the ducts. The remaining and major portion of the pressure energy is converted into kinetic energy after the suspension has reached the separation chamber and results therein in the desired corresponding increase in speed.

The curved inlet ducts need not necessarily be formed by curved blades 4, but may also be formed by tangentially directed inlet pipes symmetrically disposed along the periphery of the separation chamber, preferably in uniformly spaced relationship. In such arrangement the special feed chamber 5 of FIG. 1 may be eliminated.

While the invention has been described in detail with respect to a certain now preferred example and embodiment of the invention, it will be understood by those skilled in the art, after understanding the invention, that various changes and modifications may be made without departing from the spirit and scope of the invention, and it is intended therefore to cover all such changes and modifications in the appended claims.

What is claimed as new and desired to be secured by Letters Patent is:

1. In a method of separating in a hydrocyclone including a separation chamber, discrete particles contained in a liquid suspension into a heavy fraction and a light fraction, the steps of providing several inlet ducts connected with said separation chamber and distributed in symmetric relationship about a lengthwise axis of the separation chamber substantially tangentially oriented in reference to said axis, feeding the suspension to one end of said ducts at an inlet pressure between 0.5 and 2.5 atmospheres, and discharging the suspension from the ducts at the other end thereof into the separation chamber in the form of substantially tangentially directed partial flows having an entry speed of 1 to 8 meters per second into the chamber, whereby a minor portion of the inlet pressure energy of the suspension is converted into kinetic energy while the suspension is flowing through said ducts.

2. In the method according to claim 1, the step of feeding the suspension into the ducts at an inlet pressure of 1.0 to 2.0 atmospheres.

3. In the method according to claim 1, the step of feeding the partial flows of the suspension into the separation chamber at an entry speed of 2 to 6 meters per second.

References Cited

UNITED STATES PATENTS

| | | | |
|---|---|---|---|
| 1,743,521 | 1/1930 | Bull | 55—449 |
| 2,304,778 | 12/1942 | Cresswell | 55—457 |
| 2,681,124 | 6/1954 | Van Der Kolk | 55—459 X |

OTHER REFERENCES

Perry's Chemical Engineers Handbook, fourth edition, McGraw-Hill, New York, 1963, section 20, page 69, column 2, lines 7–26.

REUBEN FRIEDMAN, *Primary Examiner.*

HERBERT L. MARTIN, SAMIH N. ZAHARNA,
*Examiners.*

C. R. REAP, J. DECESARE, *Assistant Examiners.*

REEXAMINATION CERTIFICATE (558th)
United States Patent [19]
Wikdahl

[11] B1 3,348,683
[45] Certificate Issued   Aug. 19, 1986

[54] METHOD OF SEPARATING PARTICLES IN LIQUID SUSPENSION IN A HYDROCYCLONE FOR SEPARATING ARTICLES IN LIQUID SUSPENSION

[76] Inventor: Nils A. L. Wikdahl, 16 Burevagen, Djursholm, Sweden

Reexamination Request:
No. 90/000,864, Sep. 17, 1985

Reexamination Certificate for:
Patent No.: 3,348,683
Issued: Oct. 24, 1967
Appl. No.: 136,833
Filed: Sep. 8, 1961

[30] Foreign Application Priority Data
Sep. 13, 1960 [SE] Sweden .................. 8723/60

[51] Int. Cl.$^4$ ............................ B01D 21/26
[52] U.S. Cl. ............................ 210/787; 55/459 C; 55/459 R; 209/211; 210/512.1; 210/788
[58] Field of Search .................. 209/144, 211; 55/447–451, 456, 457, 459 C, 459 R; 210/787–789, 512.1, 512.2, 512.3

[56] References Cited

U.S. PATENT DOCUMENTS

| | | | |
|---|---|---|---|
| 1,743,521 | 1/1930 | Bull | 55/449 |
| 2,304,778 | 12/1942 | Cresswell | 55/449 |
| 2,377,524 | 6/1945 | Sampson | 92/28 |
| 2,518,084 | 7/1945 | Smith | 92/28 |
| 2,681,124 | 6/1954 | Van Der Kolk | 183/84 |
| 2,754,968 | 7/1956 | Vegter et al. | 209/211 |
| 2,781,907 | 8/1954 | Fontein | 209/211 |

FOREIGN PATENT DOCUMENTS

| | | |
|---|---|---|
| 693649 | 3/1951 | United Kingdom . |
| 708673 | 1/1952 | United Kingdom . |
| 707672 | 4/1954 | United Kingdom . |

OTHER PUBLICATIONS

Perry's Chemical Engineers Handbook, fourth edition, McGraw Hill, New York, 1963, Section 20, p. 69, col. 2, line 7–26.

*Primary Examiner*—Ernest G. Therkorn

EXEMPLARY CLAIM

1. In a method of separating in a hydrocyclone including a separation chamber, discrete particles contained in a liquid suspension into a heavy fraction and a light fraction, the steps of providing several inlet ducts connected with said separation chamber and distributed in symmetric relationship about a lengthwise axis of the separation chamber substantially tangentially oriented in reference to said axis, feeding the suspension to one end of said ducts at an inlet pressure between 0.5 and 2.5 atmospheres, and discharging the suspension from the ducts at the other end thereof into the separation chamber in the form of substantially tangentially directed partial flows having an entry speed of 1 to 8 meters per second into the chamber, whereby a minor portion of the inlet pressure energy of the suspension is converted into kinetic energy while the suspension is flowing through said ducts.

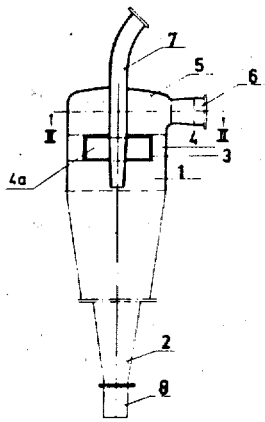

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-3 is confirmed.

* * * * *